(12) United States Patent
Cosatto et al.

(10) Patent No.: US 8,135,202 B2
(45) Date of Patent: Mar. 13, 2012

(54) AUTOMATED METHOD AND SYSTEM FOR NUCLEAR ANALYSIS OF BIOPSY IMAGES

(75) Inventors: Eric Cosatto, Red Bank, NJ (US);
Hans-Peter Graf, Lincroft, NJ (US);
Matthew L. Miller, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 856 days.

(21) Appl. No.: 12/131,346

(22) Filed: Jun. 2, 2008

(65) Prior Publication Data
US 2009/0297007 A1   Dec. 3, 2009

(51) Int. Cl.
*G06K 9/00* (2006.01)
(52) U.S. Cl. .......................... 382/133; 382/155; 382/159
(58) Field of Classification Search .................. 382/133, 382/155, 156, 158, 159
See application file for complete search history.

(56) References Cited

U.S. PATENT DOCUMENTS

| | | | | |
|---|---|---|---|---|
| 4,523,278 A * | 6/1985 | Reinhardt et al. | ............ | 382/133 |
| 4,965,725 A * | 10/1990 | Rutenberg | .................... | 382/224 |
| 5,257,182 A * | 10/1993 | Luck et al. | .................... | 382/224 |
| 5,287,272 A * | 2/1994 | Rutenberg et al. | ............ | 382/224 |
| 6,549,661 B1 * | 4/2003 | Mitsuyama et al. | .......... | 382/224 |
| 7,382,909 B1 * | 6/2008 | Nattkemper et al. | ......... | 382/133 |
| 7,729,533 B2 * | 6/2010 | Sathyanarayana | ............ | 382/159 |

* cited by examiner

*Primary Examiner* — John Strege
(74) *Attorney, Agent, or Firm* — Paul Schwarz; Joseph Kolodka

(57) ABSTRACT

An automated method and system for analyzing a digital image of a biopsy to determine whether the biopsy is normal or abnormal, i.e., exhibits some type of disease such as, but not limited to, cancer. In the method and system, a classifier is trained to recognize well formed nuclei outlines from imperfect nuclei outlines in digital biopsy images. The trained classifier may then be used to filter nuclei outlines from one or more digital biopsy images to be analyzed, to obtain the well formed nuclei outlines. The well formed nuclei outlines may then be used to obtain statistics on the size or area of the nuclei for use in determining whether the biopsy is normal or abnormal.

12 Claims, 4 Drawing Sheets

AUTOMATED METHOD AND SYSTEM FOR NUCLEAR ANALYSIS OF BIOPSY IMAGES

FIELD OF INVENTION

The invention relates to nuclear analysis of biopsy images. More particularly, the invention relates to automated methods and systems for nuclear analysis of biopsy images.

BACKGROUND OF THE INVENTION

Several studies have been done previously, analyzing the shapes and appearances of cell nuclei in cytological (biopsy) samples using machine-vision and -learning techniques. Much less work has focused on histological micrographs, likely because their analysis is considerably more difficult, and up to now, no automated system exists for this type of analysis.

In histological micrographs the appearances of the tissue and of the cell nuclei may change substantially from one sample to the next due to variations in staining, aging of the sample, or due to artifacts introduced during sample preparation. Often it is difficult to delineate clearly the chromatin from the surrounding cell plasma or the stroma. Moreover, an automated scanning system usually records images only at one focal position, and at higher magnifications not the whole depth of the sample is in focus. Pathologists tend to scan the plane of focus up and down through the sample when inspecting nuclei at a high magnification. Additional difficulties arise since the tissue may have been damaged by the excise instruments or during sample preparation, resulting in areas that cannot be used for an analysis at all.

All these factors contribute to an increase in complexity of the analysis. Accordingly, a method and system for nuclear analysis of biopsy images is needed that substantially overcomes the above-described problems.

SUMMARY

A method is described herein for training a classifier for use in automatic filtering of unlabeled nuclei outlines. The method comprises the steps of finding candidate nuclei outlines in a first image of a training biopsy; overlaying an outline image of the candidate nuclei outlines over the image of the training biopsy on an interactive graphical user interface; labeling a first group of nuclei in the image of the training biopsy with a first label using ones of the candidate nuclei outlines in the outline image having a first visual characteristic, each of the nuclei in the first group being overlaid by a corresponding one of the candidate nuclei outlines having the first visual characteristic; labeling a second group of nuclei in the image of the training biopsy with a second label using ones of the candidate nuclei outlines in the outline image having a second visual characteristic, at least one of the nuclei in the second group being overlaid by a corresponding one of the candidate nuclei outlines having the second visual characteristic; and training the classifier for use in the automatic filtering of unlabeled nuclei outlines obtained from an image of a subject biopsy, using features of the nuclei with the first and second labels.

A method is also described for automatically analyzing a subject biopsy to determine whether the subject biopsy exhibits a disease. This method comprises the steps of finding candidate nuclei outlines in an image of a training biopsy; overlaying an outline image of the candidate nuclei outlines over the image of the training biopsy on an interactive graphical user interface; labeling a first group of nuclei in the image of the training biopsy with a first label using ones of the candidate nuclei outlines in the outline image having a first visual characteristic, each of the nuclei in the first group being overlaid by a corresponding one of the candidate nuclei outlines having the first visual characteristic; labeling a second group of nuclei in the image of the training biopsy with a second label using ones of the candidate nuclei outlines in the outline image having a second visual characteristic, at least one of the nuclei in the second group being overlaid by a corresponding one of the candidate nuclei outlines having the second visual characteristic; training the classifier using features of the nuclei with the first and second labels; automatically filtering nuclei outlines obtained from the image of the subject biopsy using the classifier; and determining from the filtered outlines whether the biopsy exhibits the disease.

Further described is a system for automatically analyzing a subject biopsy to determine whether the subject biopsy exhibits a disease. The system comprises a nuclei finder for finding candidate nuclei outlines in an image of a training biopsy; overlaying an outline image of the candidate nuclei outlines over the image of the training biopsy on an interactive graphical user interface; labeling a first group of nuclei in the image of the training biopsy with a first label using ones of the candidate nuclei outlines in the outline image having a first visual characteristic, each of the nuclei in the first group being overlaid by a corresponding one of the candidate nuclei outlines having the first visual characteristic; labeling a second group of nuclei in the image of the training biopsy with a second label using ones of the candidate nuclei outlines in the outline image having a second visual characteristic, at least one of the nuclei in the second group being overlaid by a corresponding one of the candidate nuclei outlines having the second visual characteristic; training the classifier using features of the nuclei with the first and second labels; automatically filtering nuclei outlines obtained from the image of the subject biopsy using the classifier; and determining from the filtered outlines whether the biopsy exhibits the disease.

DETAILED DESCRIPTION OF THE INVENTION

Disclosed herein is an automated method and system for analyzing a digital image of a tissue sample (biopsy) to determine whether the biopsy is normal or abnormal, i.e., exhibits some type of disease such as, but not limited to, cancer. In the method and system, a classifier is trained to recognize well formed nuclei outlines from imperfect nuclei outlines in digital biopsy images. The trained classifier may then be used to filter nuclei outlines from one or more digital biopsy images to be analyzed, to obtain the well formed nuclei outlines. The well formed nuclei outlines may then be used to obtain statistics on the size or area of the nuclei for use in determining whether the biopsy is normal or abnormal.

Figure 1:
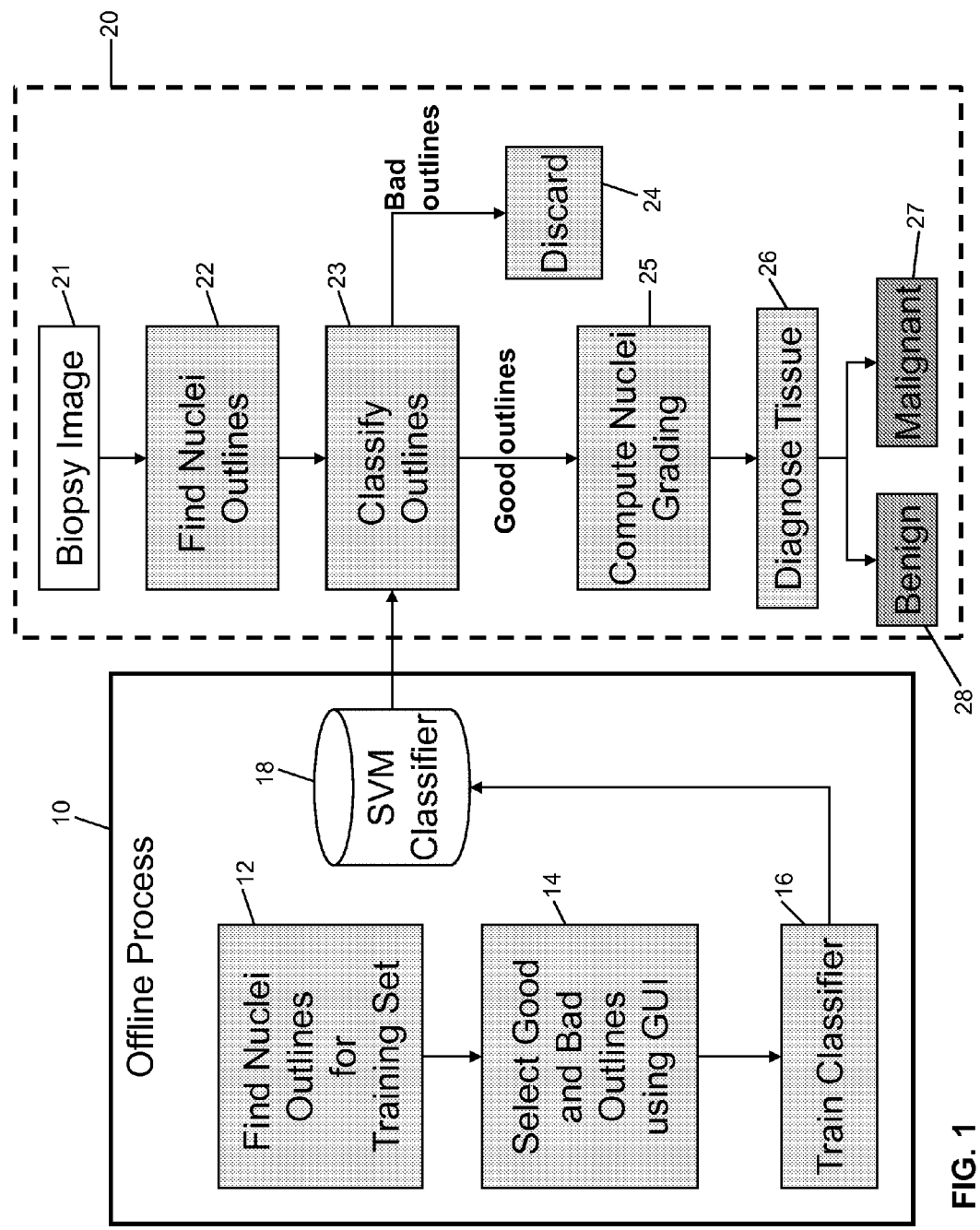
FIG. 1 is a flow chart depicting an embodiment of an automated method for analyzing a digital image of a biopsy to determine whether the biopsy is normal or abnormal.

FIG. 1 is a flow chart of an embodiment of the method as it applies to analyzing digital histological micrograph biopsy images to determine whether the biopsy is benign or malignant. One of ordinary skill in the art will recognize that the method is also applicable to other types of microscopic biopsy analyzing techniques including but not limited to digital cryosection micrograph biopsy images, and other types of tissue diagnosis. The method commences with offline classifier training process 10. In step 12 of the offline classifier training process 10, any suitable image analysis technique or combination of techniques is/are used to identify or locate areas of tissue containing nuclei in a digital histological micrograph biopsy image (the original micrograph image), and candidate nuclei outlines are found and extracted from the surrounding stromal tissue in the nuclei-containing tissue areas. The candidate nuclei outlines extracted using the image analysis techniques (nuclei finder) will be used further on to create a set of labeled training data.

Figure 2:
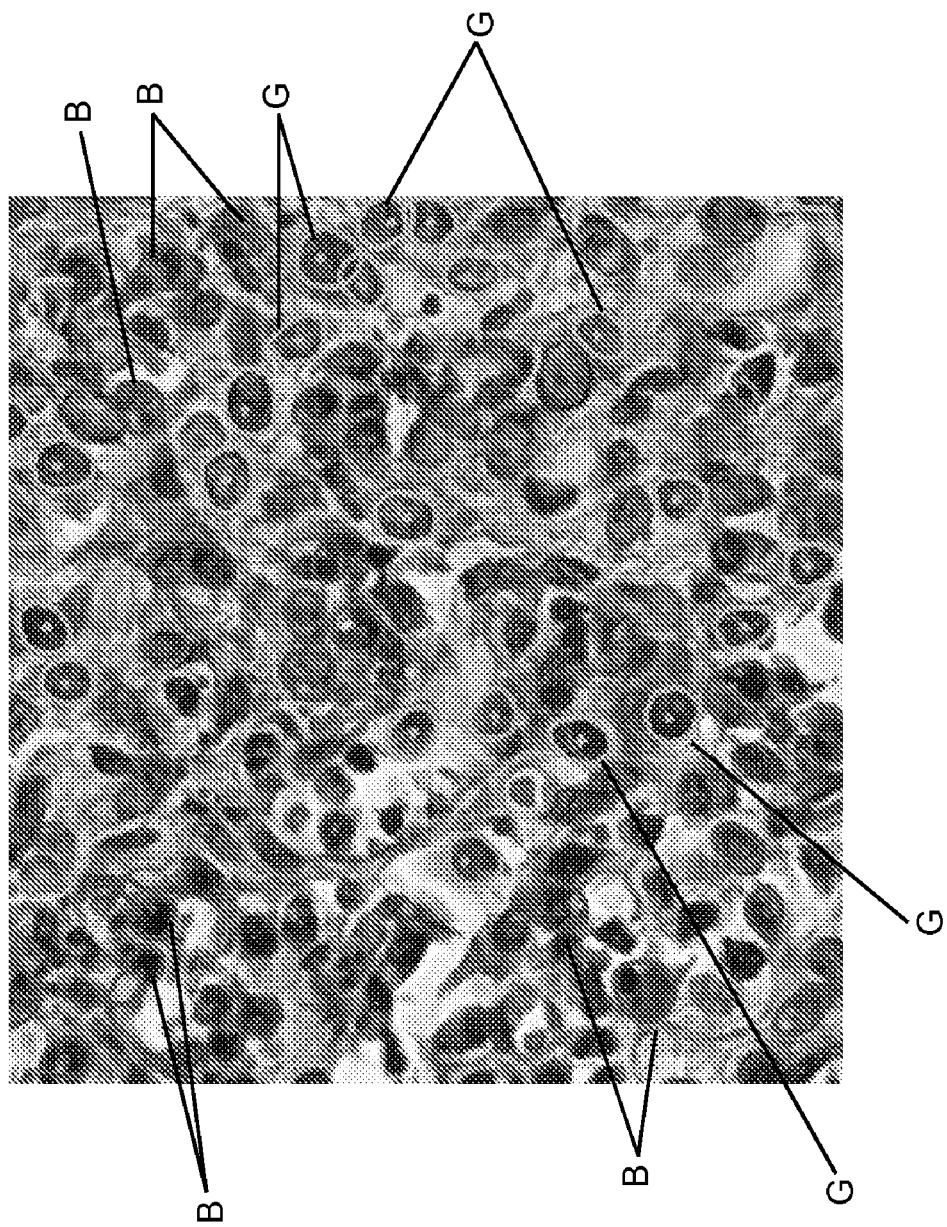
FIG. 2 illustrates an embodiment of a graphical user interface after an operator has labeled all the well formed outlines encircling their corresponding nuclei in the original micrograph biopsy image as "good" and all the spurious or poorly formed outlines encircling their corresponding nuclei in the original micrograph biopsy image as "bad."

Because of large variations in the appearance of biopsy images as well as differences in staining quality, there exist many opportunities for the nuclei finder to produce spurious candidate nuclei outlines. A typical occurrence of a spurious outline occurs when two or more nuclei are clumped together, resulting in one outline encompassing all the nuclei. Such spurious outlines will throw off the statistics of the nuclear area measurements. Since, however, there are usually a large number of nuclei in a biopsy image, it is possible to ignore those for which the nuclei finder failed to produce a sufficiently trustworthy outline. In order to filter out reliably those spurious outlines, an image of the extracted candidate nuclei outlines (which includes both "good" and "bad" outlines) are overlaid over the original micrograph biopsy image on an interactive graphical user interface in step 14 of the offline classifier training process 10. The outlines are overlaid over the same areas of the original micrograph biopsy image they were found in. Then, using the interactive graphical user interface, an operator labels all the well formed outlines G encircling their corresponding nuclei in the original micrograph biopsy image as "good" and all the spurious or poorly formed outlines B encircling their corresponding nuclei in the original micrograph biopsy image as "bad," as shown in FIG. 2, thereby creating a set of labeled training data comprising the well formed nuclei outlines and the spurious nuclei outlines. The candidate nuclei outline overlay of well formed and spurious nuclei outlines operates as a guide for identifying the corresponding nuclei to be labeled in the original micrograph biopsy image. A purpose of the overlay is to allow the corresponding nuclei outlines to be identified and labeled in the original micrograph image. In one embodiment, the operator performs the labeling by selecting all the spurious outlines in the original micrograph biopsy image. The selection may be made, for example and not limitation, with a mouse and clicking on the spurious outlines to be labeled as such (the absence of labels associated with the well formed outlines identifies them as such). In alternate embodiment, the operator performs the labeling by selecting all the well formed outlines in the original micrograph biopsy image (the absence of labels associated with the spurious outlines identifies them as such).

It is easy and intuitive for a human, even if untrained, to perform this classification when presented with outlines overlaid onto the original histological micrograph biopsy image. Using the active learning method of step 14 to speed-up the training process, it was possible to quickly label more than 10,000 examples and train a classifier with 95% accuracy (cross-validation).

In step 16 of the off line classifier training process 10, a classifier is trained using the set of labeled training data created in step 14. The classifier in a preferred embodiment, comprises a support vector machine. Support vector machines are well known in the art, for example, see U.S. Patent Application Publication No. 20070094170, entitled Spread Kernel Support Vector Machine and/or U.S. Patent Application Publication No. 20060112026, entitled Parallel Support Vector Method and Apparatus, both of which are assigned to the assignee herein and disclose methods for training support vector machines using labeled training data. The disclosures of U.S. Patent Application Publication Nos. 20070094170 and 20060112026 are incorporated herein by reference. For the training step, each labeled nuclei outline (good and bad) is encoded into a vector of features, however, only some parameters of the image are encoded, such as color values along the border or inside the border. If a Support Vector machine is used for this classification, the parameters are explicitly extracted with conventional algorithms. If a convolutional neural network (CNN) is used for this classification, the image pixel values are entered and the CNN develops the feature extractors automatically. For this task, only features relevant to discriminate between well formed outlines that match their underlying nuclei image and spurious outlines that do not follow the outline of an underlying nuclei, are used. Features selective for nuclear malignancy are not used in this step.

The features extracted may include features computed from the shape of the outline of each labeled nuclei, features computed from pixel-maps directly underneath the outline of each labeled nuclei, which relate to how well the outline is fitting the edge of the labeled nuclei, features computed from pixels inside the bound of the outline of each labeled nuclei, and features computed from the neighborhood of the labeled nuclei.

In one embodiment, the set of features extracted include those that capture edge map response along the outline, texture within the outline, and outline geometry. With respect to edge map response along the outline, an ideal outline will closely follow the edge of the nucleus. Hence, a vector v is built from the edge map that was extracted from the hematoxylin channel and sample values along the outline. The features derived from the vector of edge response v include average (v), standard deviation (v), and smoothness.

Features that capture texture within the outline are useful for differentiating between a normal nucleus and, for example, clumps of nuclei or a bad outline encompassing surrounding stroma (a outline extending beyond the nucleus will typically contain some amounts of eosin and/or white). Also, a clump of several small nuclei will contain a higher response from the small nuclei detector than from the large nuclei detector. Accordingly, vectors h, e, w, g, ns, and nl are built from the values within the outline taken from the hematoxylin map (vector h), the eosin map (vector e), the white mask (vector w), the edge map (vector g), the small nuclei detection map (vector ns), and the large nuclei detection map (vector nl). The features derived from vectors h, e, w, g, ns, and nl include average (h), standard deviation (h), average (e), standard deviation (e), average (w), average (ns), maximum (ns), average (nl), maximum (nl), average (g), and standard deviation (g).

Features that capture outline geometry useful because normal nuclei are round to slightly oval, are mostly symmetric, and have a smooth edge (not too ragged). In addition, the areas of normal nuclei must lie within a certain range: if their areas are too small, then they are lymphocytes, plasma cells or fragments of nuclei; if their areas are too large, they are likely to be clumps of nuclei. Accordingly, vectors are built from area, i.e., the number of pixels bounded by a outline; perimeter, i.e., the number of pixels along the outline; compactness, i.e., $$\frac{4 \cdot \pi \cdot a}{p^2},$$

which results in a value of 1 for a disk, otherwise less; smoothness, i.e, $$e^{-\frac{1}{n}\sum_{i=0}^{n}|r_i - sr_i|}$$

where r is the vector of radii of the nucleus and sr is the low-pass filter version of r; and symmetry $$1 - \frac{\sum_{i=0}^{n2}|r_i - r_{i+n2}|}{\sum_{i=0}^{n2} r_i + r_{i+n2}}$$

where $$n2 = \frac{n}{2}.$$

One of ordinary skill in the art will appreciate that classifiers other than support vector machines may be used in the present method. For example, in an alternate embodiment, the classifier may comprise a neural network.

In step 18 of the offline classifier training process 10, parameter weightings associated with each support vector generated during the training of the classifier, are stored by the classifier in a memory associated therewith.

Once the classifier has been trained, the method continues with automatic tissue classification process 20. In step 21 of the automatic biopsy classification process 20, a digital histological micrograph biopsy image to be analyzed is obtained and in step 22, the image is processed to identify or locate areas of tissue containing nuclei, and candidate nuclei outlines are found and extracted from the surrounding stromal tissue in the nuclei-containing tissue areas. Any suitable image analysis technique or combination of techniques may be used to perform step 22 including the image analysis technique(s) used during the offline classifier training process 10.

In step 23 of the automatic biopsy classification process, the extracted candidate nuclei outlines are classified into "good" or well formed nuclei outlines and "bad" or spurious nuclei outlines. In step 24, the "bad" nuclei outlines are discarded. Thus, for each region of interest (ROI) of a given biopsy image, we now have a set of nuclei for which a precise outline has been found and have simply discarded the nuclei outlines that were classified by the classifier as spurious.

In step 25 of the automatic biopsy classification process, the remaining good nuclei outlines are used to compute nuclei grading, i.e., calculate the size (the diameter of the nuclei, typically measured at the long axis as they tend to be elliptical in shape) and/or area of each nuclei in each region of interest (ROI) of the biopsy image. Nuclear atypia (Pleomorphism) is a strong indicator of malignancy and the nuclear area is a widely recommended parameter. Hence, in one embodiment, step 25 may be performed by measuring the nuclear area enclosed by the good nuclei outlines using, for example but not limitation, a scan-line algorithm, which counts the number of pixels enclosed by each nuclei outline. This measure is gathered over an entire region of the biopsy image to obtain its $75^{th}$ percentile (pc75), where the pc75 is the value of the entire region, so that 75% of all nuclei are smaller and 25% are larger (in area, i.e., have more pixels inside the outline). In other words, the multitude of parameters from many nuclei are used to classify a whole region or area. This measure is robust against possible outliers.

In step 26, the biopsy image is diagnosed for cancer using the nuclei grading computed above. For example, using the embodiment described immediately above, if the biopsy image is found to have one or more regions with pc75≧t, the biopsy is declared suspicious for malignancy in step 27, and if the biopsy image is found to not have one or more regions with pc75≧t, the biopsy is declared benign in step 28. The threshold t may be obtained by cross validation over a training set of labeled biopsy images.

Figure 3:
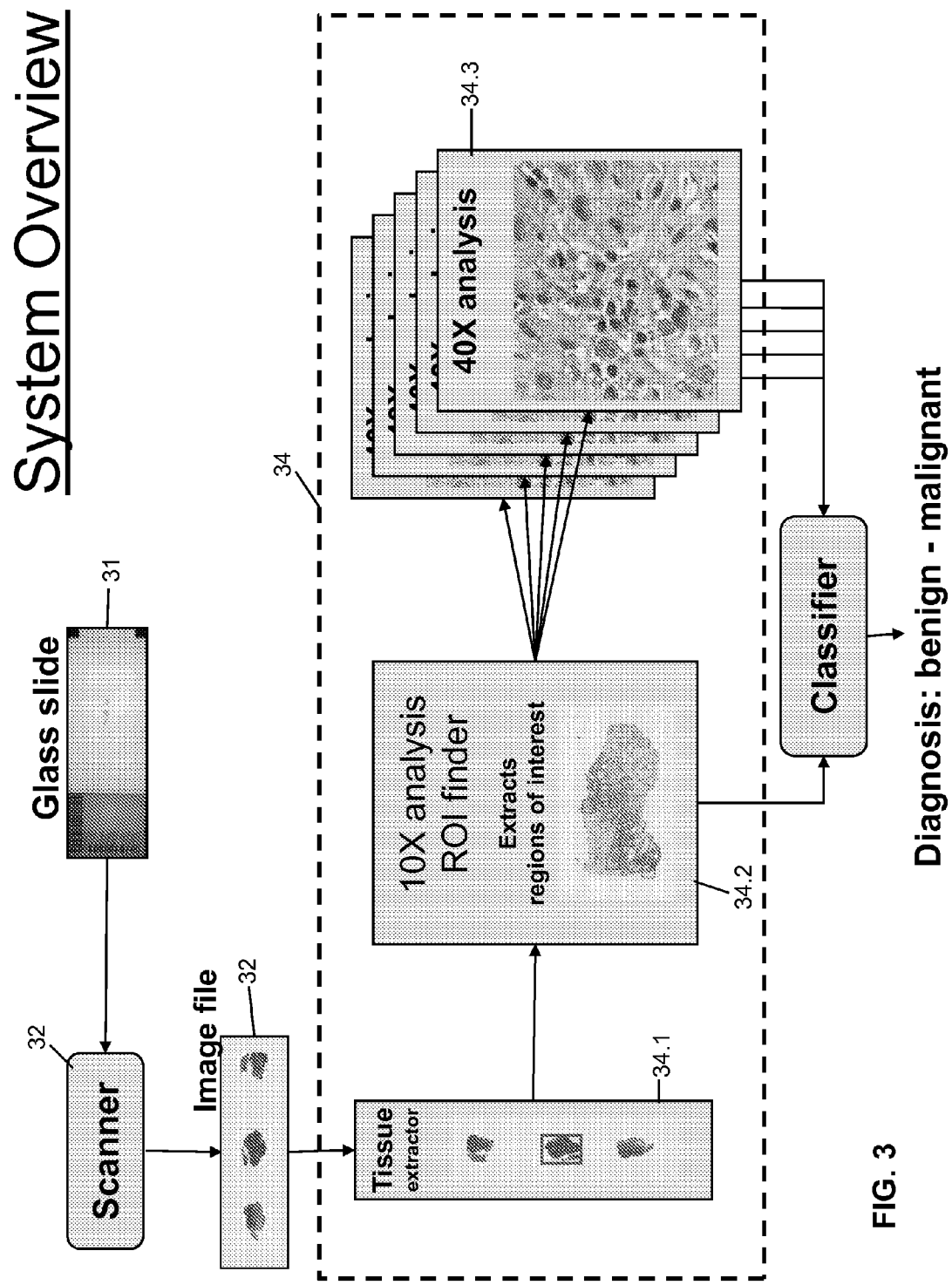
FIG. 3 is a functional block diagram depicting a system for performing an offline classifier training process.

Referring to FIG. 3, the offline classifier training process may be implemented using the image analysis techniques described below. It should be understood, however, that the offline classifier training process may be implemented using other suitable image analysis techniques.

Image Preprocessing: Several tissue or biopsy samples may be arranged on a substrate, such as a glass slide 31, as shown in FIG. 3. The biopsy samples are processed with a stain, such as hematoxylin-eosin (HE), and then digitally imaged using, for example and not limitation, a scanner 32 or a microscope equipped with a camera, to obtain digital images 33 of the biopsy samples. The resolution of these images may be above 100K dpi (4.35 pixels per micron).

Referring still to FIG. 3, a tissue extractor 34 comprising a succession of filters 34.1-34.3 are then applied to the images of the tissue samples at different resolutions, to progressively "zoom-in" on regions-of-interest (ROI) in the images, such ROI including, without limitation, regions where large nuclei may be present in the images. In one embodiment, the succession of filters include a first filter based on luminance for locating the tissue itself on the slide; a second filter for rejecting pen markings made on the slide to separate the tissues; a third filter for rejecting areas that are out of focus; and a fourth filter for adaptively finding the average eosin and hematoxylin colors and projecting the pixels onto them to obtain hematoxylin and eosin intensity maps. HE staining is a well known method for handling histological samples. The hematoxylin (dark magenta) stains the nuclear chromatin, while the eosin (pinkish) stains cytoplasmic components. Hence, there is a need to find for each tissue sample the actual hematoxylin (H vector) and eosin (E vector) colors and then normalize the image based on these two vectors. The average H and E vectors may be found using the following method:

$$\overline{H} = \frac{1}{n}\sum_{i=1}^{n}(1 - \overline{P}_i^R)^4 \overline{P}_i$$

where P is a RGB pixel and $P^R$ is the red component of P.

$$\overline{E} = \frac{1}{n}\sum_{i=1}^{n}\|\overline{P}_i - (\overline{P}_i \cdot \overline{H})\overline{H}\|^4 \overline{P}_i$$

Alternatively, a Principal Component Analysis (PCA) may be performed on the color pixels. PCA finds the direction of maximum variance. Care has to be taken to identify the hematoxylin and eosin from the two main eigenvectors (corresponding to the two highest eigenvalues). This may be done by observing that the eosin dye always has the higher content of red. The drawback of this method is that the main direction of variance is not always correlated with the physics of the dying process. In practice, however, this alternative method produces good results but is outperformed by the method described immediately above.

Finding Areas of Large Nuclei: Areas of large nuclei may be found in the images by running a two-dimensional Difference of Gaussian filter (DoG) over each of the images. This operation can be accelerated by running a separate one-dimensional filter horizontally and vertically over the image. The size of the Gaussian is matched to the desired size of the nucleus to be detected. In this embodiment, the focus is on detecting nuclei larger than normal (at least twice normal area) which are indicative of malignancy (cancer). Non-maxima suppression may be applied to the resulting map and a list of candidate positions for each nucleus is obtained. These positions are used both to select suspicious regions within the tissue and as a starting point for nuclei outline extraction.

Often an enlarged nucleus exhibits a vesicular shape, resulting in a low amount of hematoxylin in its center contrasting with a marked nuclei outline. These type of nuclei are very difficult to detect using the above method since their hematoxylin content is rather small. Accordingly, a Hough transform may be used to detect these type of nuclei, where the contributions of diametrally opposed intensities in the edge map are accumulated for each pixel. This is done at multiple angles and for a range of nuclei diameters. This operation is computationally expensive: $O(nx \cdot ny \cdot na \cdot nd)$ where nx, ny are the size of the image in x and y direction, na is the number of angle increments, nd is the number of nuclei diameters. Hence, this method is typically applied only to selected parts of the biopsy image, e.g., areas of low hematoxylin/eosin ratio.

Finding Nuclei Outlines: Nuclei contours or outlines may be found in the images, in one embodiment, using an Active Contour algorithm (or Snakes) is used, starting at the previously obtained locations, to find the "lowest energy" outlines. Opposing constraints of elasticity and edge-matching are used to iteratively update the snakes to match the outlines of nuclei on the image. Several initial conditions and elastic strengths are used per location, thus producing $n \cdot e \cdot i$ outlines, where n is the number of detections in the image, e is the number of different elastic strengths and i is the number of different initializations.

One skilled in the art will recognize that any suitable computer system may be used to execute the methods disclosed herein. The computer system may include, without limitation, a mainframe computer system, a workstation, a personal computer system, a personal digital assistant (PDA), or other device or apparatus having at least one processor that executes instructions from a memory medium.

The computer system may further include a display device or monitor for displaying operations associated with the learning machine and one or more memory mediums on which one or more computer programs or software components may be stored. For example, one or more software programs which are executable to perform the methods described herein may be stored in the memory medium. The one or more memory mediums may include, without limitation, CD-ROMs, floppy disks, tape devices, random access memories such as but not limited to DRAM, SRAM, EDO RAM, and Rambus RAM, non-volatile memories such as, but not limited hard drives and optical storage devices, and combinations thereof. In addition, the memory medium may be entirely or partially located in one or more associated computers or computer systems which connect to the computer system over a network, such as the Internet.

The methods described herein may also be executed in hardware, a combination of software and hardware, or in other suitable executable implementations. The learning machine methods implemented in software may be executed by the processor of the computer system or the processor or processors of the one or more associated computers or computer systems connected to the computer system.

Figure 4:
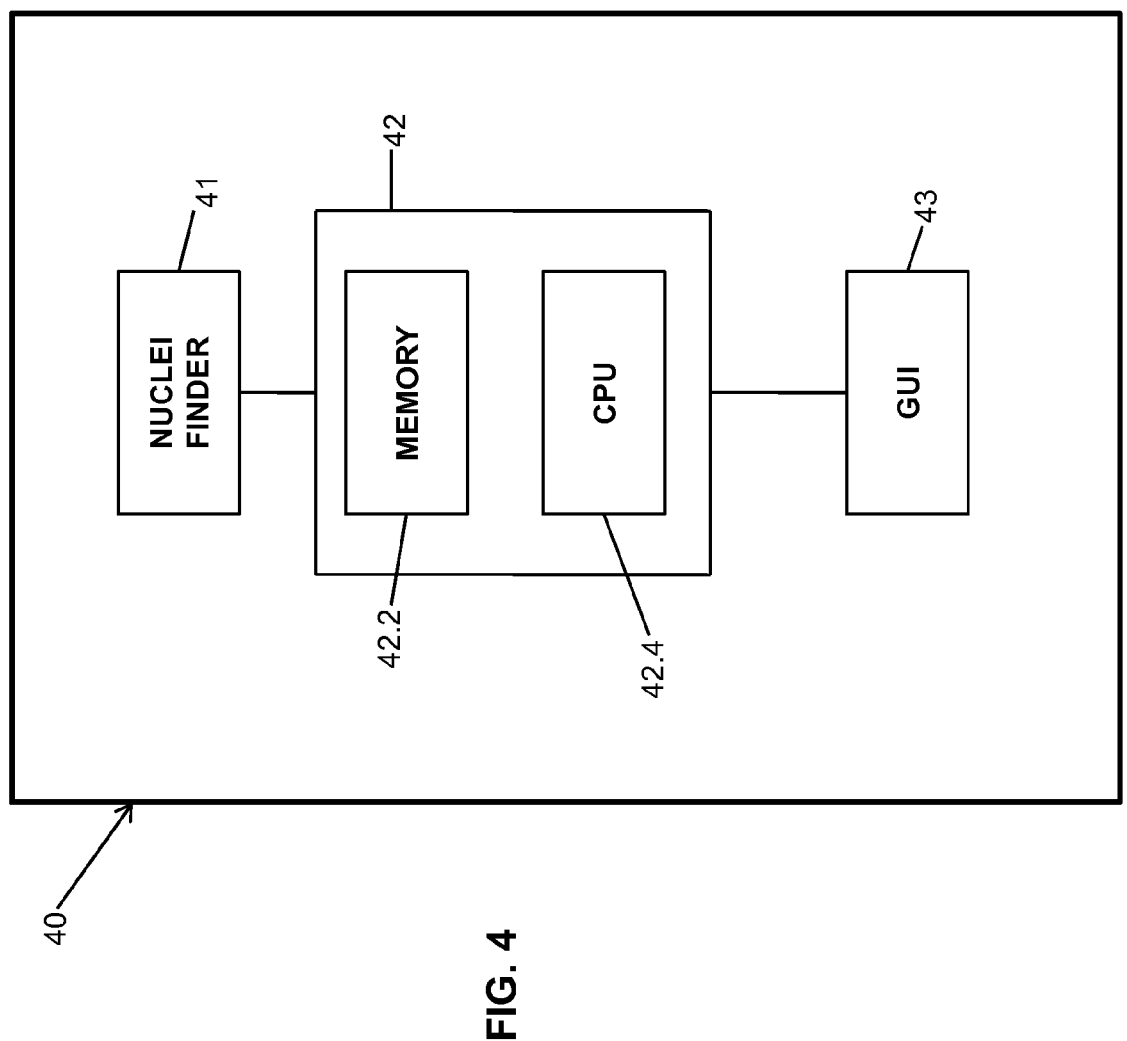
FIG. 4 is a block diagram of an exemplary embodiment of a computer system for performing the methods described herein.

FIG. 4 is a block diagram of an exemplary embodiment of a computer system 40 for performing the methods described herein. The computer system 40 includes the earlier described nuclei finder 41, one or more processors 42 (only one shown), and the earlier described graphical user interface 43. The processor 42 includes a memory 42.2 that stores programmed instructions for executing the methods described herein. The processor 42 further includes a Central Processing Unit (CPU) 42.4 for executing the program instructions, thus making the computer system operative for analyzing digital images of biopsy samples to determine whether the biopsies are normal or abnormal.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

What is claimed is:

1. A method for training a classifier for use in automatic filtering of unlabeled nuclei outlines, the method comprising the steps of:

finding candidate nuclei outlines in a first image of a training biopsy;

generating an outline image of the found candidate nuclei outlines;

overlaying the outline image of the candidate nuclei outlines over the same areas of the first image of the training biopsy where the nuclei outlines were found, on an interactive graphical user interface;

labeling a first group of nuclei in the image of the training biopsy with a first label using ones of the candidate nuclei outlines in the outline image having a first visual characteristic, each of the nuclei in the first group being overlaid by a corresponding one of the candidate nuclei outlines having the first visual characteristic;

labeling a second group of nuclei in the image of the training biopsy with a second label using ones of the candidate nuclei outlines in the outline image having a second visual characteristic, at least one of the nuclei in the second group being overlaid by a corresponding one of the candidate nuclei outlines having the second visual characteristic; and training the classifier for use in the automatic filtering of unlabeled nuclei outlines obtained from an image of a subject biopsy, using features of the nuclei labeled with the first and second labels, the features capturing at least one of an edge map response along the outline of the labeled nuclei, a texture within the outline of the labeled nuclei, and a geometry of the outline of the labeled nuclei.

2. The method according to claim 1, wherein the classifier is a support vector machine.

3. The method according to claim 2, further comprising the step of storing support vectors obtained during the training step for use by the classifier in the automatic filtering of unlabeled nuclei outlines obtained from the image of the subject biopsy.

4. A method for automatically analyzing a subject biopsy to determine whether the subject biopsy exhibits a disease, the method comprising the steps of:
 finding candidate nuclei outlines in an image of a training biopsy;
 generating an outline image of the found candidate nuclei outlines;
 overlaying the outline image of the candidate nuclei outlines over the same areas of the first image of the training biopsy where the nuclei outlines were found, on an interactive graphical user interface;
 labeling a first group of nuclei in the image of the training biopsy with a first label using ones of the candidate nuclei outlines in the outline image having a first visual characteristic, each of the nuclei in the first group being overlaid by a corresponding one of the candidate nuclei outlines having the first visual characteristic;
 labeling a second group of nuclei in the image of the training biopsy with a second label using ones of the candidate nuclei outlines in the outline image having a second visual characteristic, at least one of the nuclei in the second group being overlaid by a corresponding one of the candidate nuclei outlines having the second visual characteristic;
 training a classifier using features of the nuclei labeled with the first and second labels, the features capturing at least one of an edge map response along the outline of the labeled nuclei, a texture within the outline of the labeled nuclei, and a geometry of the outline of the labeled nuclei;
 automatically filtering nuclei outlines obtained from the image of the subject biopsy using the classifier; and
 determining from the filtered outlines whether the biopsy exhibits the disease.

5. The method according to claim 4, wherein the classifier is a support vector machine.

6. The method according to claim 5, further comprising the step of storing support vectors obtained during the training step for use by the classifier in the automatic filtering step.

7. The method according to claim 4, further comprising the step of finding nuclei outlines in the image of the subject biopsy prior to the automatically filtering step.

8. The method according to claim 4, wherein the determining step is performed by the step of calculating at least one of a size and an area of each of the filtered nuclei outlines.

9. A system for automatically analyzing a subject biopsy to determine whether the subject biopsy exhibits a disease, the system comprising:
 a nuclei finder for finding candidate nuclei outlines in an image of a training biopsy and generating an outline image of the found candidate nuclei outlines;
 a graphical user interface for:
  overlaying the outline image of the candidate nuclei outlines over the image of the training biopsy where the nuclei outlines were found;
  labeling a first group of nuclei in the image of the training biopsy with a first label using ones of the candidate nuclei outlines in the outline image having a first visual characteristic, each of the nuclei in the first group being overlaid by a corresponding one of the candidate nuclei outlines having the first visual characteristic;
  labeling a second group of nuclei in the image of the training biopsy with a second label using ones of the candidate nuclei outlines in the outline image having a second visual characteristic, at least one of the nuclei in the second group being overlaid by a corresponding one of the candidate nuclei outlines having the second visual characteristic; and
 a classifier trained using features of the nuclei labeled with the first and second labels, the features capturing at least one of an edge map response along the outline of the labeled nuclei, a texture within the outline of the labeled nuclei, and a geometry of the outline of the labeled nuclei, the classifier for:
  automatically filtering nuclei outlines obtained from the image of the subject biopsy; and
  determining from the filtered outlines whether the biopsy exhibits the disease.

10. The system according to claim 9, wherein the classifier is a support vector machine.

11. The system according to claim 10, wherein the classifier uses support vectors obtained during training to automatically filtering nuclei outlines.

12. A method for training a support vector machine classifier for use in automatic biopsy classification, the method comprising the steps of:
 finding candidate nuclei in a histological image of a training biopsy;
 generating an outline image of the found candidate nuclei;
 on an interactive graphical user interface, overlaying the outline image of the candidate nuclei over the same areas of the histological image of the training biopsy where the nuclei were found;
 on the interactive graphical user interface using the overlying outline image of the candidate nuclei outlines, labeling the candidate nuclei in the image of the training biopsy having well formed nuclei outlines as good candidate nuclei;
 on the interactive graphical user interface using the overlying outline image of the candidate nuclei outlines, labeling the candidate nuclei in the image of the training biopsy having poorly formed nuclei outlines as bad candidate nuclei with the interactive graphical user interface;
 encoding each of the labeled nuclei into nuclei feature vectors that capture at least one of an edge map response along the outline of the labeled nuclei, a texture within the outline of the labeled nuclei, and a geometry of the outline of the labeled nuclei;
 training the support vector machine classifier with the nuclei feature vectors of the labeled nuclei to generate a plurality of support vectors; and
 storing the support vectors for use by the support vector machine classifier in the automatic classification of an image of a subject biopsy.

\* \* \* \* \*